United States Patent
Avner et al.

(10) Patent No.: US 8,782,046 B2
(45) Date of Patent: Jul. 15, 2014

(54) SYSTEM AND METHODS FOR PREDICTING FUTURE TRENDS OF TERM TAXONOMIES USAGE

(75) Inventors: Amit Avner, Herzliya (IL); Omer Dror, Tel Aviv (IL)

(73) Assignee: Taykey Ltd., Herzliya (IL)

(*) Notice: Subject to any disclaimer, the term of this patent is extended or adjusted under 35 U.S.C. 154(b) by 114 days.

(21) Appl. No.: 13/482,473

(22) Filed: May 29, 2012

(65) Prior Publication Data
US 2012/0239694 A1    Sep. 20, 2012

Related U.S. Application Data

(63) Continuation-in-part of application No. 13/279,673, filed on Oct. 24, 2011, which is a continuation-in-part of application No. 13/050,515, filed on Mar. 17, 2011, which is a continuation-in-part of application No. 13/214,588, filed on Aug. 22, 2011.

(60) Provisional application No. 61/316,844, filed on Mar. 24, 2010.

(51) Int. Cl.
    *G06F 17/30*    (2006.01)
(52) U.S. Cl.
    USPC ........... 707/736; 707/690; 707/954; 707/705; 707/608; 707/803
(58) Field of Classification Search
    CPC ................................................. G06F 17/30769
    USPC .................. 707/690, 954, 960, 736, 705, 803
    See application file for complete search history.

(56) References Cited

U.S. PATENT DOCUMENTS

| | | |
|---|---|---|
| 6,463,430 B1 | 10/2002 | Brady et al. |
| 6,523,021 B1 | 2/2003 | Monberg et al. |
| 7,035,864 B1 | 4/2006 | Ferrari et al. |
| 7,062,483 B2 | 6/2006 | Ferrari et al. |
| 7,389,252 B2 | 6/2008 | Robb et al. |
| 7,409,404 B2 | 8/2008 | Gates |
| 7,426,499 B2 | 9/2008 | Eder |

(Continued)

FOREIGN PATENT DOCUMENTS

| | | |
|---|---|---|
| JP | 2000305952 | 11/2000 |
| KR | 20090034052 | 4/2009 |
| KR | 20090068803 | 6/2009 |
| KR | 20090080822 | 7/2009 |

OTHER PUBLICATIONS

International Searching Authority, "International Search Report and Written Opinion" for the corresponding International Patent Application PCT/IL2011/028846; Date of Mailing: Sep. 28, 2011.

*Primary Examiner* — Sana Al Hashemi
(74) *Attorney, Agent, or Firm* — M&B IP Analysts, LLC

(57) ABSTRACT

A method and system for predicting future trends of terms taxonomies of users generated content. The method comprises crawling one or more sources of users generated content to collect phrases mentioned by users of the one or more data sources; periodically analyzing one or more term taxonomies to determine at least a trend of at least a non-sentiment phrase with respect of a plurality of sentiment phrases, wherein a term taxonomy is an association between a non-sentiment phrase and a sentiment phrase, the non-sentiment and sentiment phrases are included in the collected phrases; and generating a prediction of future behavior of the at least trend with respect of the one or more term taxonomies.

21 Claims, 9 Drawing Sheets

(56) References Cited

U.S. PATENT DOCUMENTS

| | | |
|---|---|---|
| 7,428,554 B1 | 9/2008 | Coberley et al. |
| 7,433,876 B2 | 10/2008 | Spivack et al. |
| 7,543,232 B2 | 6/2009 | Easton, Jr. et al. |
| 7,567,957 B2 | 7/2009 | Ferrari et al. |
| 7,617,184 B2 | 11/2009 | Ferrari et al. |
| 7,620,628 B2 | 11/2009 | Kapur et al. |
| 7,890,382 B2 | 2/2011 | Robb et al. |
| 2005/0091200 A1 | 4/2005 | Melton et al. |
| 2007/0050389 A1 | 3/2007 | Kim et al. |
| 2007/0100779 A1 | 5/2007 | Levy et al. |
| 2007/0106627 A1 | 5/2007 | Srivastava et al. |
| 2007/0143296 A1 | 6/2007 | Casion |
| 2007/0192300 A1 | 8/2007 | Reuther et al. |
| 2007/0276676 A1 | 11/2007 | Hoenig et al. |
| 2008/0027769 A1 | 1/2008 | Eder |
| 2008/0052630 A1 | 2/2008 | Rosenbaum et al. |
| 2008/0082463 A1 | 4/2008 | Cheng et al. |
| 2008/0109285 A1 | 5/2008 | Reuther et al. |
| 2008/0133488 A1 | 6/2008 | Bandaru et al. |
| 2008/0243531 A1 | 10/2008 | Hyder et al. |
| 2008/0249764 A1 | 10/2008 | Huang et al. |
| 2008/0263589 A1 | 10/2008 | Jacobson et al. |
| 2008/0281915 A1 | 11/2008 | Elad et al. |
| 2009/0113468 A1 | 4/2009 | Steelberg et al. |
| 2009/0164400 A1 | 6/2009 | Amer-Yahia et al. |
| 2009/0164897 A1 | 6/2009 | Amer-Yahia et al. |
| 2009/0216581 A1 | 8/2009 | Carrier et al. |
| 2010/0004974 A1 | 1/2010 | Libby et al. |
| 2010/0070293 A1 | 3/2010 | Brown et al. |
| 2010/0100537 A1 | 4/2010 | Druzgalski et al. |
| 2010/0138451 A1* | 6/2010 | Henkin et al. ............ 707/803 |
| 2010/0262454 A1* | 10/2010 | Sommer et al. ............ 705/10 |
| 2011/0099207 A1 | 4/2011 | Brown et al. |
| 2011/0161312 A1 | 6/2011 | Wallman |

* cited by examiner ent. The search is static by nature and over time, as more and more irrelevant data is available, the more difficult it is to get to meaningful information.

SYSTEM AND METHODS FOR PREDICTING FUTURE TRENDS OF TERM TAXONOMIES USAGE

CROSS-REFERENCE TO RELATED APPLICATIONS

This application is a continuation-in-part of U.S. patent application Ser. No. 13/279,673 filed on Oct. 24, 2011. The '673 application is a continuation-in-part of U.S. patent application Ser. No. 13/050,515, filed on Mar. 17, 2011 which claims the benefit of U.S. provisional application No. 61/316,844 filed on Mar. 24, 2010. The '515 application is also a continuation-in-part of U.S. patent application Ser. No. 13/214,588, filed on Aug. 22, 2011. The contents of each of the above-referenced applications are incorporated herein by reference.

TECHNICAL FIELD

The invention generally relates to the generation of term taxonomies based on information available on the Internet, and more specifically to the prediction of trends based, in part, on term taxonomies generated with respect of phrases.

BACKGROUND

There is an abundance of information available on the Internet through content on web pages, social networks, user generated content, as well as other sources of information, which are accessible via the world-wide web (WWW). Search systems make the access to such information speedy and generally cost effective. However, there are also certain disadvantages, one of which is the fact that even targeted searches to generally available information result in large amounts of 'hits' requiring the user to sift through a lot of unwanted information. The search is static by nature and over time, as more and more irrelevant data is available, the more difficult it is to get to meaningful information.

Various users of information are interested in more elaborate analysis of the information available through the Internet as well as the time-value of such information. That is, older information may be less important than newer information and the trends relating to the information may be more interesting than the data relating to the information at any given point in time. Current solutions monitor online behavior, rather than attempting to reach intents. For example, today advertisers attempting to target customers can merely do so based on where they go, what they do, and what they read on the web. For example, a user reading about the difficulties of a car manufacturer might be targeted for an advertisement to purchase that manufacturer's car, which would not necessarily be appropriate. In other words, today's available solutions are unable to distinguish this case from an article where the same company presents a new model of a car. Likewise, the prior art solutions are unable to correlate items appearing in such sources of information to determine any kind of meaningful relationship.

Today, advertising is all about demographics and does not handle true intent. Advertisers are trying to target people based on, for example, their age and music preferences, rather than capturing the target audience's true intentions. In search advertising, for example, when searching for "Shoes" the age and/or the gender of the user submitting the search query does not necessarily affect the content of the advertisements displayed to the user. Advertisements for shoes are provided merely because searchers have the intent for shoes. However, this intent-based approach is limited in scope and inaccurate in targeting the required audiences.

An ability to understand human trends dynamically and in real-time, as they are expressed, and the ability to predict future behavior of such trends may be of significant advantage to advertisers, presenters, politicians, chief executive officers (CEOs) and others who may have an interest in deeper understanding of the information and the target of an audience's intent. Tools addressing such issues are unavailable today. Hence, it would be therefore advantageous to provide such tools.

SUMMARY

Certain embodiments disclosed herein include a system for a system for predicting future trends of term taxonomies of users generated content. The system comprises a network interface for accessing one or more data sources to receive the users generated connect; an analysis unit for periodically analyzing one or more term taxonomies to determine at least a trend of at least a non-sentiment phrase with respect of a plurality of respective sentiment phrases, wherein a term taxonomy is an association between a non-sentiment phrase and a sentiment phrase, the non-sentiment and sentiment phrases are included in the users generated content; and an analysis unit for generating a prediction of future behavior of the at least trend with respect of the one or more term taxonomies.

Certain embodiments disclosed herein also include for a method for predicting future trends of terms taxonomies of users generated content. The method comprises crawling one or more sources of users generated content to collect phrases mentioned by users of the one or more data sources; periodically analyzing one or more term taxonomies to determine at least a trend of at least a non-sentiment phrase with respect of a plurality of sentiment phrases, wherein a term taxonomy is an association between a non-sentiment phrase and a sentiment phrase, the non-sentiment and sentiment phrases are included in the collected phrases; and generating a prediction of future behavior of the at least trend with respect of the one or more term taxonomies.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
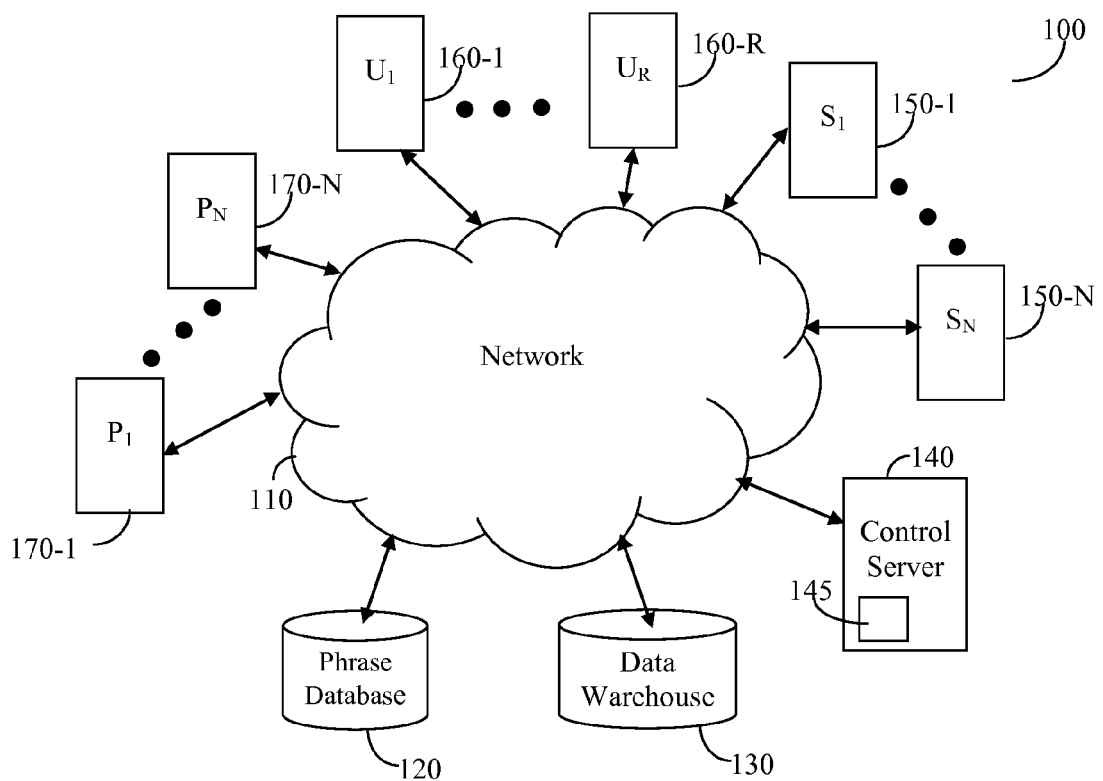
FIG. 1 is a schematic diagram of a system for creation of term taxonomies by mining web based user generated content.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various exemplary embodiments disclosed herein include allowing for the prediction of future trends based on term taxonomies of user generated content. In one embodiment, this may be achieved by real-time crawling through user generated content, for example, but not limited to, social networks. Then, taxonomies of terms based, for example, on a predefined dictionary of terms of interest are created. An analysis is performed to identify past trends with respect to terms to enable prediction of future behavior with respect to each term of the identified term. Through the crawling process the data respective of terms is collected and grouped into usable forms. This prediction of future behavior of terms may enable a user to act to either increase or decrease the effect based on user needs and requirements.

As a non-limiting example, by identifying terms related to basketball among social networks the system, disclosed herein, can identify basketball fans. By identifying terms related to pizza during an important basketball game among basketball fans, the system enables the prediction of a trend related to pizza or fast food during a future broadcast of a basketball game. Such identification may be brought to the attention of an advertiser to place an advertisement for a fast food restaurant (or chain) prior to or during broadcasting of a basketball game. Such a connection between the fast food restaurant and a basketball game is a first degree of a hidden connection.

While this first degree of a hidden connection is possible, a more complex degree of connections can be also detected. For example, a group of persons may discuss the phrase 'eggs' and mention the phrase 'bananas' in that context. Another group of persons may mention the terms 'bananas', but also the phrase 'cats'. Therefore, there is detected a hidden connection between the phrases 'cats' and 'eggs' that may be of interest to, e.g., an advertiser. Hence, the system according to one embodiment, can detect at least a first degree separation of non-sentiment phrases and/or at least a first degree separation of two different non-sentiment phrases that are associated with a common non-sentiment phrase.

In one embodiment, the system disclosed herein analyzes a textual content of a brand name from a data source, for example, a social network on the web, and collects the terms that appear in proximity to the brand name even though they are not directly connected to one another. For example, if the term "shoes" repeatedly appears in predefined proximity limitations to the term "Pepsi®", the system identifies a hidden connection between these two phrases. The proximity may be determined by a number of words or characters in between mentions, existence on the same web page, a number of web pages within a website between the at least two non-sentiment phrases, and other appropriate measures of proximity of text objects, or any combination thereof.

In another embodiment, the system identifies a hidden connection between several non-sentiment phrases that repeatedly appear in proximity to each other by subtracting the phrases connected directly from the total phrases that appear in proximity of each other. For example, if the non-sentiment phrases "shoes" and "cola" repeatedly appear in proximity, the system detects the direct connections between the non-sentiment phrases "cola and "Pepsi®" and subtracts the phrase "cola" and by that identifies the hidden connection between the term "shoes" and "Pepsi®."

FIG. 1 depicts an exemplary and non-limiting schematic diagram of a system 100 for creation of term taxonomies according to one embodiment. To a network 110 there are connected various components that comprise the system 100. The network 110 can be a local area network (LAN), a wide area network (WAN), a metro area network (MAN), the world wide web (WWW), the Internet, the like, and combinations thereof.

A phrase database 120 is connected to the network 110 and contains identified phrases that are either preloaded to the phrase database 120 or that were detected during operation of the system as such phrases, and as further explained in greater detail herein below. Phrases may contain, but are not limited to, terms of interest, brand names, and the like. A data warehouse 130 is also connected to the network 110, for storing processed information respective of phrases and as further explained in greater detail herein below. The operation of the system 100 is controlled by a control server 140 having executable code stored in a memory 145, such that the control server 140 may perform the tasks discussed in more detail herein below. The memory 145 may be any form of tangible memory.

While the processing may be performed using solely the control server 140, embodiments disclosed herein may include one or more processing units 170-1 through 170-N which allow for handling of the vast amount of information needed to be processed, without departing from the scope of the invention.

Also connected to the network 110 are one or more sources of information 150-1 through 150-N. These may include, but are not limited to, social networks, e.g., Google+®, Facebook®, Twitter™, web pages, blogs, and other sources of textual information. Typically, a plurality of users using user nodes 160-1 through 160-R access the information sources 150-1 through 150-N periodically and provide their own comments and information therein. According to the teachings disclosed herein, it is these types and pieces of information that are used by the system 100 for its operation which is described in further detail with respect of FIG. 2. These types and pieces of information are processed by the system 100.

A user node 160-j (j=1, . . . , R) is a computing device operated by a user and includes, but is not limited to, a personal computer, a smart phone, a mobile phone, a tablet computer, or any type of device that enables connectivity to the Internet.

Figure 2:
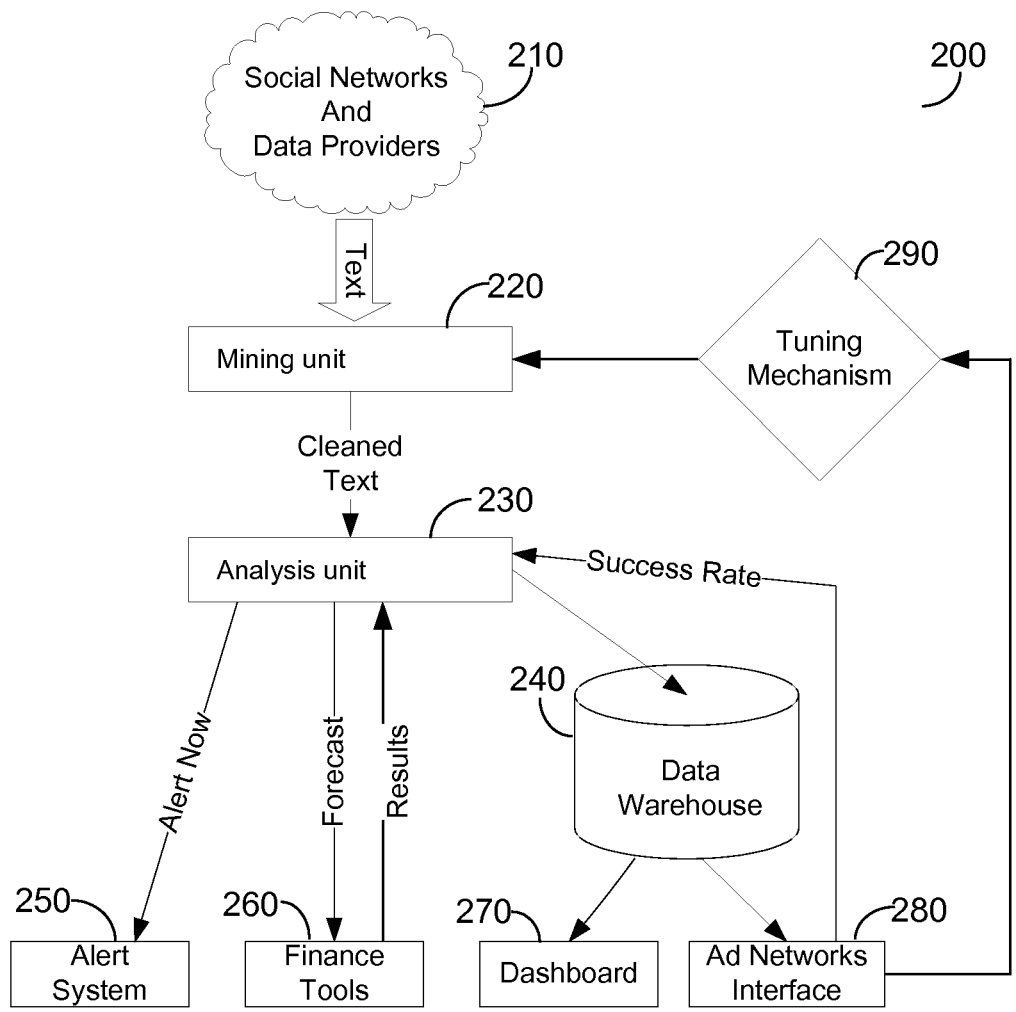
FIG. 2 is an overview block diagram of the operation of the system.

FIG. 2 shows an exemplary and non-limiting overview block diagram 200 of the operation of the system 100. One or more data sources 210, including, but not limited to, social networks and other user provided sources of information 210 are checked and or regularly supplied for text to be provided to a mining process. These types and pieces of information are processed by the system 100 process. The access to the data sources 210 is through the network 110 by means of a network interface (not shown). In an embodiment of the invention, the mining process can be executed by a mining unit of the system 200.

The task of the mining process is to extract from the text all irrelevant data that cannot be effectively used in the analysis that is performed by the system. Basically, the mining task is to identify sentiment phrases and non-sentiment phrases. In addition to sentiment extraction, the mining process "cleans" the data collected. Sentiment phrases may include, but not by way of limitation, words such as "love", "hate", "great", "disaster", "beautiful", "ugly" and the like, but also "not good", "great time", "awfully good", and more. Cleaning of data may include phrases common in social networks such as, but of course not limited to, conversion of "GRREEEAT!" into "great", and so on. In addition, cleaning may include removing conjunctions and words that appear with extremely high frequency or are otherwise unknown or irrelevant. While single words have been shown here, multiple words grouped as a phrase may also be treated as a sentiment phrase, such as but not by way of limitation "great experience", "major issues", "looks great" and more. These words describe a sentiment typically applied to a non-sentiment phrase.

The text coming in from the one or more data source(s) 210 is mined for such phrases, for example, by using a reference for phrases stored in a database, such as the phrase database 120. The mining process includes understanding that a complex phrase such as "I hate I Love Lucy" actually contains a sentiment phrase "love" and a non-sentiment phrase "I Love Lucy", where the word "love" in the non-sentiment phrase is not to be analyzed as a standalone phrase. Furthermore, the sentence "I saw the movie I Love Lucy" does not comprise any sentiment phrase, and therefore would not cause the mining unit 220 using the mining process to associate a sentiment phrase to the non-sentiment phrase. The phrases database 120, in one embodiment, is a preloaded database and is updated periodically. However, it is also possible to automatically update the phrase database 120 upon detection of a phrase as being either one of a sentiment phrase or a non-sentiment phrase. Furthermore, a sentiment phrase within a non-sentiment phrase is ignored for this purpose as being a sentiment phrase and is only treated as part of the non-sentiment phrase. It should therefore be understood that a term taxonomy is created by association of a non-sentiment phrase with a sentiment phrase. Hence, for example, in the context of the phrase "I hate I Love Lucy" the sentiment phrase is "hate", the non-sentiment phrase is "I Love Lucy" and the phrases are associated together in accordance with the principles of the invention to create a taxonomy.

According to another embodiment, a comparative numerical value is associated with each sentiment. For example, the word "love" may have a score of "10", the word "indifferent" the score of "0" and "hate" the score of "−10". Hence, positive sentiments would result in a positive score while negative sentiments would result in a negative score. Such score associations may be performed initially manually by a user of the system, but over time the system 200, based on a feedback provided by, e.g., a tuning mechanism 290, can position the sentiment phrases relative to each other to determine an ever changing score value to every sentiment phrase. This is of high importance as language references change over time and references which may be highly positive can become negative or vice versa, or decline or incline as the case may be. This can be achieved by aggregation of sentiments with respect to a specific non-sentiment phrase resulting in a taxonomy that reflects the overall sentiment to the non-sentiment phrase.

In an embodiment, a weighted sentiment score corresponding to a plurality of sentiment phrases collected for a respective non-sentiment phrase is generated. That is, within a specific context, the plurality of sentiments associated with a non-sentiment phrase is collected, and then an aggregated score is generated. The aggregated score may be further weighted to reflect the weight of each of the individual scores with respect to other scores.

The cleaned text that contains the phrases is now processed using an analysis process which in an embodiment is performed by an analysis unit 230 of the system 200. The analysis may provide based on the type of process information needed, the likes of alerts and financial information. An alert may be sounded by an alert system 250 when it is determined that a certain non-sentiment phrase, for example, a certain brand name, is increasingly associated with negative sentiment phrases. This may be of high importance as the manufacturer associated with the brand name would presumably wish to act upon such negative information as soon as possible in real-time. Likewise, a positive sentiment association may be of interest for either supporting that sentiment by certain advertising campaigns to further strengthen the brand name, or by otherwise providing certain incentives to consumers of products of the brand name. One of ordinary skill in the art should readily realize the opportunities the systems 100 and 200 provide.

Returning to FIG. 2, the analyzed data is stored in a data warehouse 240, shown also as data warehouse 130 in FIG. 1. Through a dashboard utility 270 it is possible to provide queries to the data warehouse 240. An advertisement network interface 280 further enables advertising related management, for example, providing advertisements relative to specific phrases used. In addition, the information is tuned by a tuning mechanism 290 thereby allowing for feedback to enable better mining of the data by the mining unit 220. In the case of an advertisement a success rate, for example conversion rates, is also provided to the analysis process for better analysis of the cleaned text by creating real time taxonomies.

An analysis may further include grouping and classification of terms in real-time, as they are collected by the system. Furthermore, current trends can be analyzed and information thereof provided, including, without limitation, an inclining trend and a declining trend with respect to the sentiment phrase associated with a non-sentiment phrase. Moreover, using the analysis process performed by the analysis unit 230 it is possible to detect hidden connections, i.e., an association between non-sentiment phrases that have a proximity correlation. The analysis unit 230 hence detects direct and hidden connections between non-sentiment phrases, and all connections between the non-sentiment phrases.

As will be described below connections are identified based one or more proximity rules. In an embodiment, non-sentiment phrases that have a hidden connection can be associated with a sentiment phrase. For example, if a web site of a talk show refers more positively or more frequently to a brand name product, the analysis unit 230 can find the correlation or connection between non-sentiment phrases that have a hidden connection and then compare the sentiment phrases thereof. That way, if the talk show web site tends to favor and recommend the brand name product it would make more sense to spend, for example, advertisement money there, than if the sentiment phrase would be a negative one. In one embodiment, a hidden connection is any one of a first degree separation of two non-sentiment phrases, and a first degree separation of the two different non-sentiment phrases that are associated with a common non-sentiment phrase.

Figure 3:
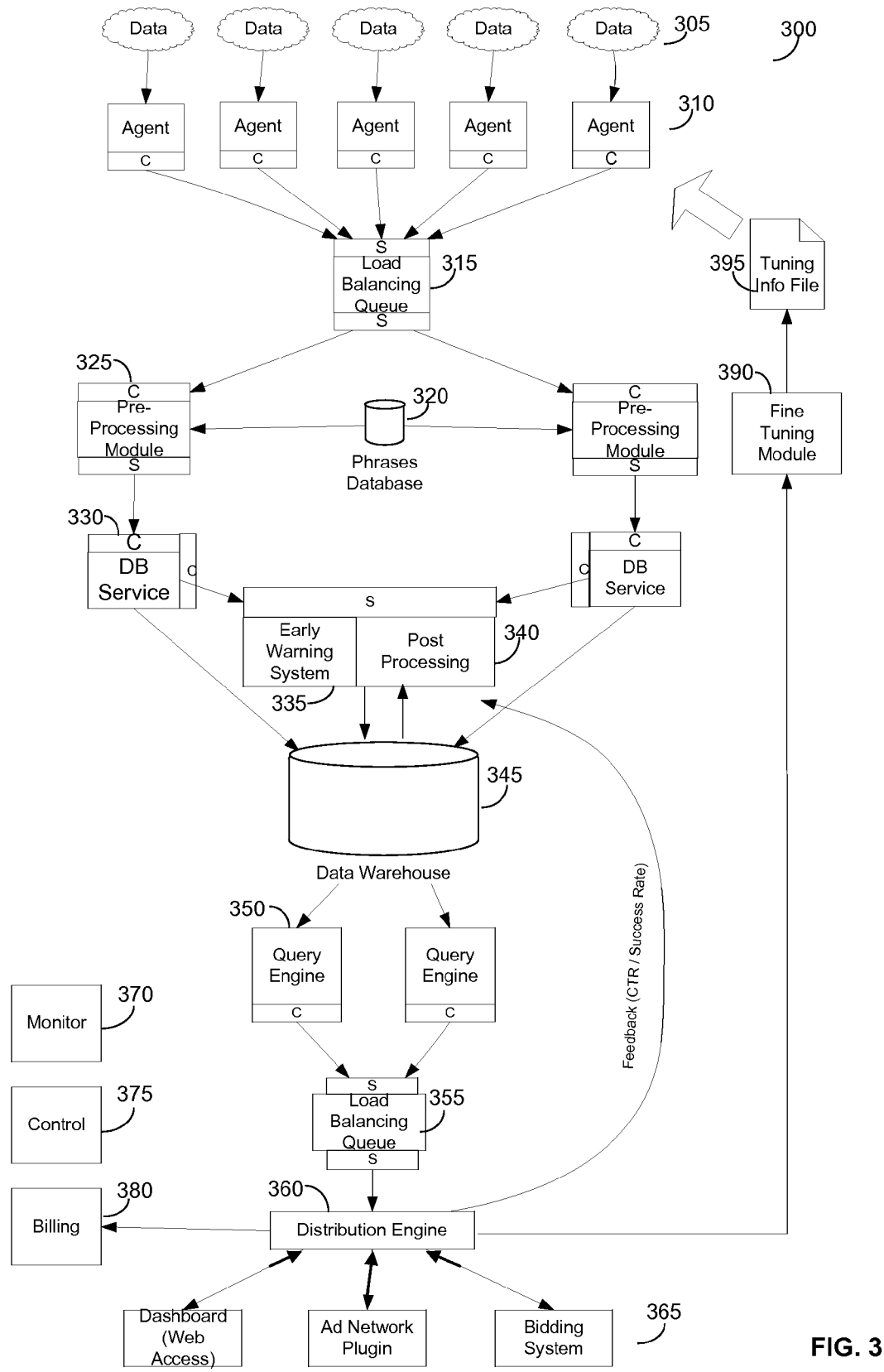
FIG. 3 is a detailed block diagram of the operation of the system depicted in FIGS. 1 and 2.

FIG. 3 shows an exemplary and non-limiting detailed block diagram of the operation of a system 300 according to the certain embodiment discussed herein. Data sources 305, including the web sites and web services such as Google+®, Facebook® and Twitter™, but not limited thereto, are probed periodically by agents 310 of the system 300. The agents 310, in one embodiment, are operative under the control of the control server 140 or on any one of the processing units 170, when applicable. A load balancing queue 315, operative for example on the control server 140, balances the loads of the agents 310 on the execution units such that their operation does not overload any one such unit. In the exemplary and non-limiting implementation, two processing paths are shown, however, more may be used as necessary.

In one embodiment, the loading of an agent 310 is also a function of the periodic checking of the respective data source 305. Each processing unit, for example, one or more of the processing units 170, performs a preprocessing using the preprocessing module 325. The preprocessing, which is the mining of phrases as explained hereinabove, is performed respective of a phrase database 320 to which such processing units 170 are coupled to by means of the network 110. A database service utility 330, executing on each processing node 170, stores the phrases in the data warehouse 345, shown in FIG. 1 as the data warehouse 130. An early warning system 335 is communicatively connected with the database service utility 330, and configured to generate early warning based on specific analysis. For example, an increase of references to a brand name product above a threshold value may result in an alarm. In one embodiment, this happens only when the source of such an increase is a specific source of interest. This is performed because some sources 305 are more meaningful for certain non-sentiment phrases than others, and furthermore, some sentiment phrases are more critical when appearing in one source 305 versus another. The early warning system 335 utilizes processing services provided by a post processing module 340 which may be implemented on one of the processing units 170 or on the control server 140 (of FIG. 1).

The second portion of the system 300 depicted in FIG. 3, concerns the ability to query the data warehouse 345 by one or more query engines 350, using a load balancing queue 355 as may be applicable. The queries may be received from a plurality of sources 365 including, but not limited to, a dashboard for web access, an advertisement network plugin, and a bidding system. The sources 365 are connected to a distribution engine 360 that receives the queries and submits them to the load balancing queue 355 as well as distributes the answers received thereto. The distribution engine 360 further provides information to a fine tuning module 390, executing for example on the control server 140, and then to an exemplary and non-limiting tuning information file 395. Other subsystems such as a monitor 370 for monitoring the operation of the system 300, a control 375, and a billing system 380 may all be used in conjunction with the operation of the system 300.

Figure 4:
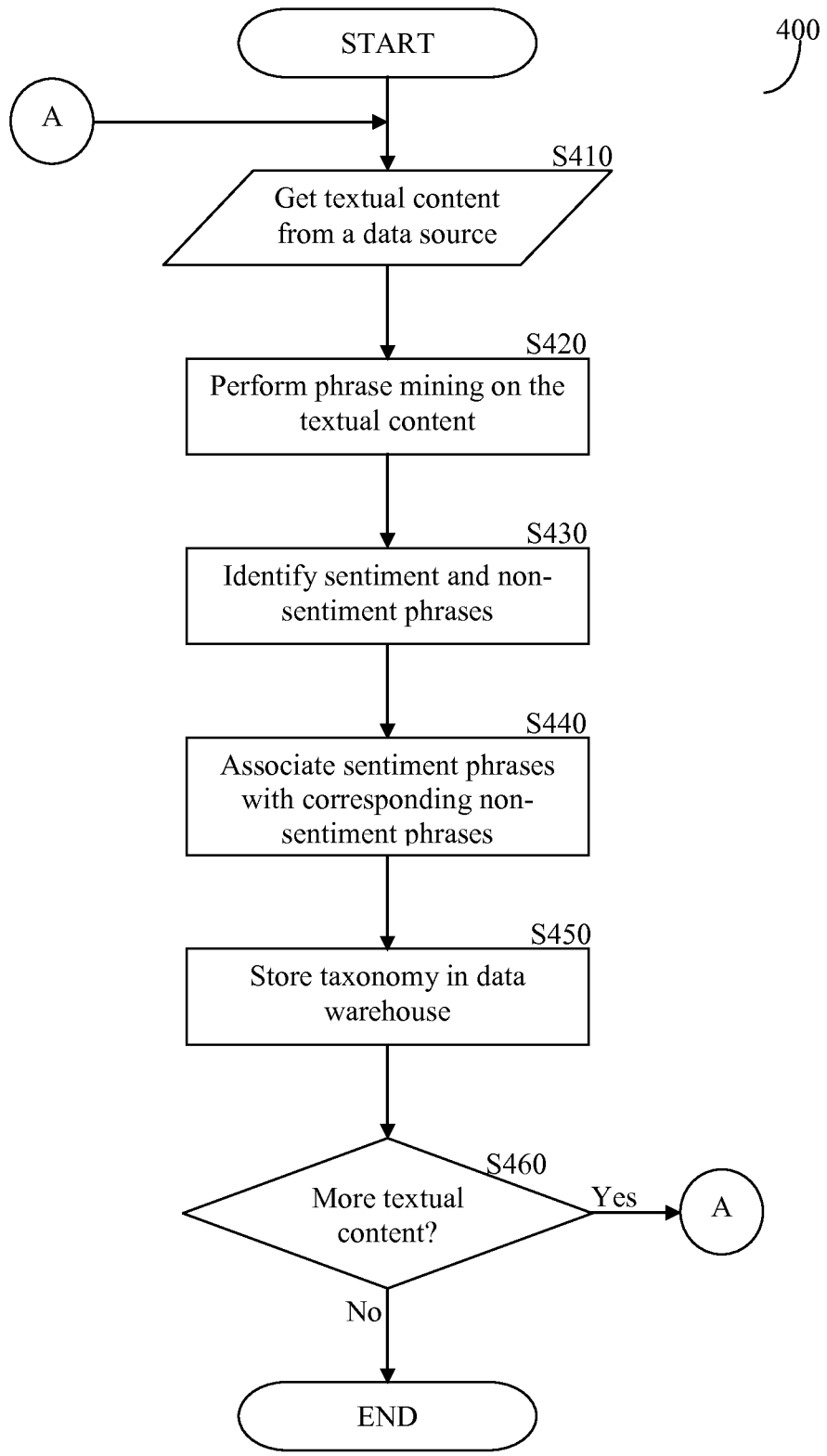
FIG. 4 is a flowchart describing a method for creation of term taxonomies by mining web based user generated content.

FIG. 4 shows an exemplary and non-limiting flowchart 400, a method for creation of term taxonomies. In S410 the system, for example and without limitations, any one of the systems 100, 200 and 300 described hereinabove, receives textual content from one or more information sources. As shown above this can be performed by using the agents 310. In S420, phrase mining is performed. The phrase mining includes at least the detection of phrases in the received content and, in S430, identification and separation of sentiment and non-sentiment phrases. In S440, sentiment phrases are associated with non-sentiment phrases as may be applicable to create term taxonomies.

One or more term taxonomies are created by association of sentiment phrases to their respective non-sentiment phrases, including but not limited to, aggregation of sentiment phrases with respect to a non-sentiment phrase. In S450, the created taxonomies then are stored, for example, in the data warehouse 130. This enables the use of the data in the data warehouse by queries as also discussed in more detail hereinabove. In S460, it is checked whether additional text content is to be gathered, and if so execution continues with S410; otherwise, execution terminates.

Figure 5:
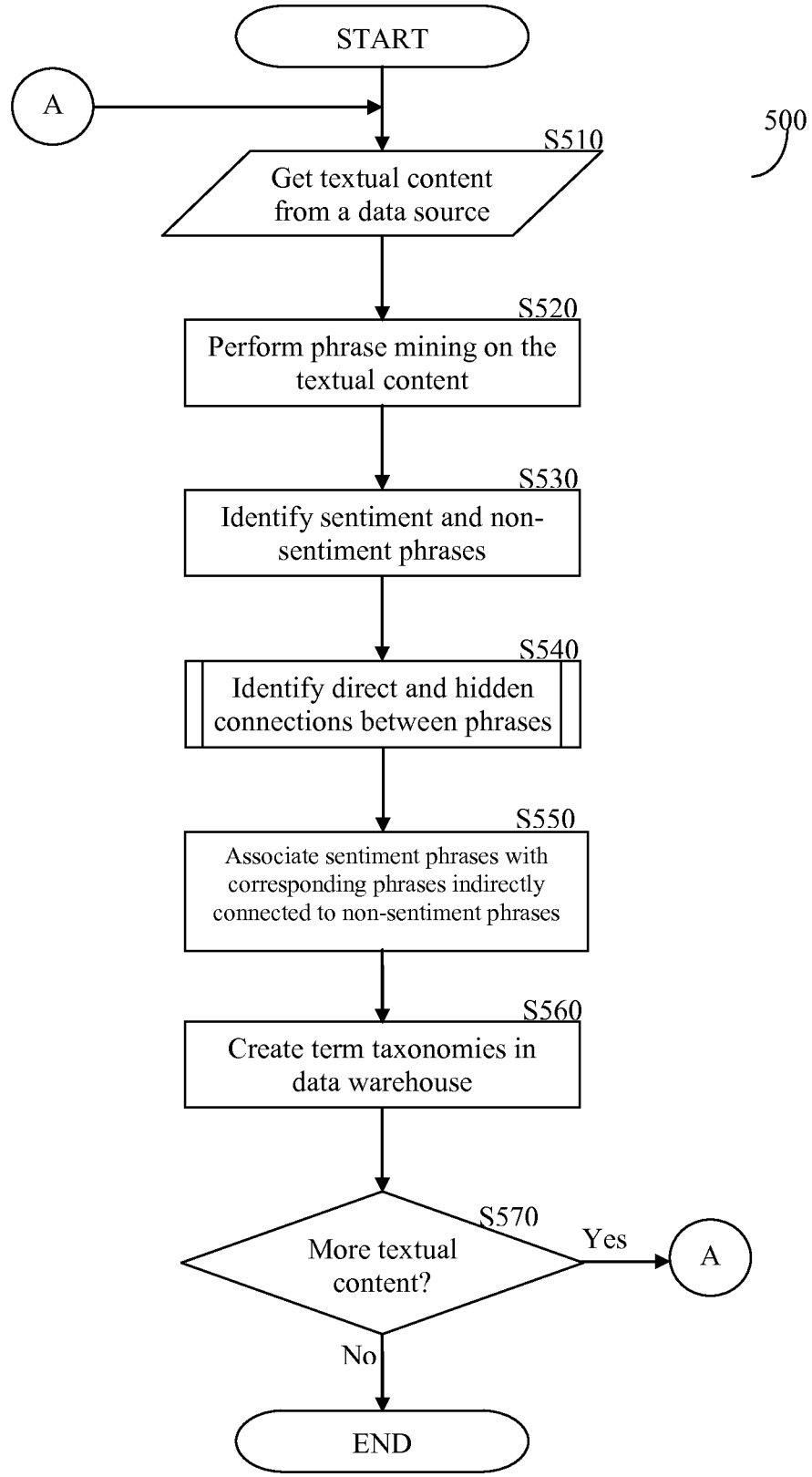
FIG. 5 is a flowchart describing a method for real-time detection of direct and hidden connections between phrases according to an embodiment.

FIG. 5 shows an exemplary and non-limiting flowchart 500 of a method for identification of direct and hidden connections between terms based on term taxonomies. In S510 the system, for example and without limitations, any one of the systems 100, 200 and 300 described hereinabove, receives textual content from one or more information sources. As shown above, the textual collection can be performed by using the agents 310. The information sources may include, but are not limited to, social networks, web blogs, news feeds, and the like. The social networks may include, for example, Google+®, Facebook®, Twitter®, and so on.

In S520, a phrase mining process is performed for at least the detection of non-sentiment and sentiment phrases in the received textual content. In S530, identification and separation of sentiment and non-sentiment phrases is performed by the mining process. The separated non-sentiment phrases are saved for example, in the data warehouse 130. In S540, identification of hidden connections between non-sentiment phrases is generated as described in greater detail herein below with respect of FIG. 6.

Figure 6:
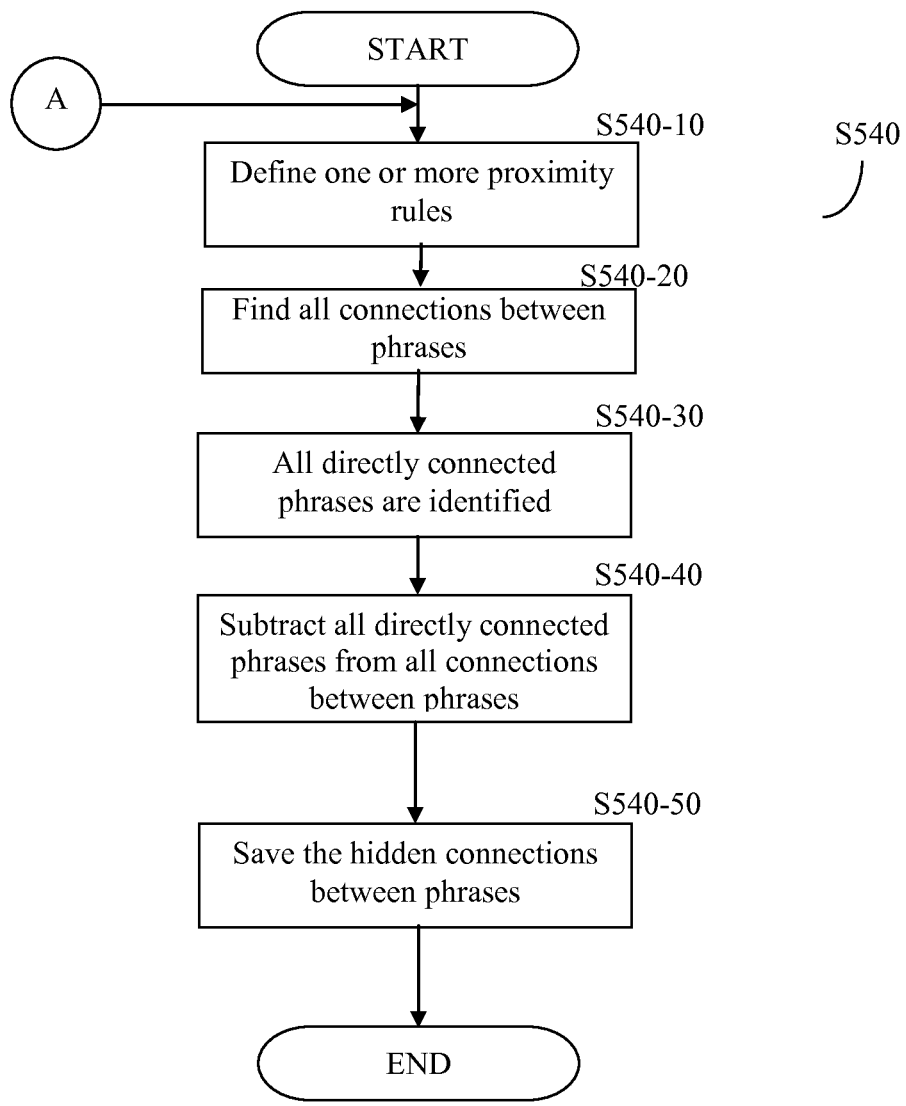
FIG. 6 is a flowchart describing details of the method for identification of hidden connections between phrases according to an embodiment.

In FIG. 6 an exemplary and non-limiting flowchart depicts S540 for identification of hidden connections between phrases in accordance with one embodiment. In S540-10, one or more proximity rules are defined, for example, by a user of the system. A proximity rule may be, but is not limited to, distance measured in number of words or characters between two or more non-sentiment phrases, number of web pages within a web site between the non-sentiment phrases, the number of mentions of the non-sentiment phrases in a web page, different web pages, and/or a piece of collected text, any combinations thereof, and so on. For example, the user may define a value '1 to 4' as the number of words between two non-sentiment phrases, so that phrases will be considered in proximity. Thus, for the following post on a social network page "my shoes are full with cola", the phrases "shoes" and "cola" are considered in proximity.

In S540-20, all connections between the non-sentiment phrases are identified. Specifically, in an embodiment, such connections are identified for at least two non-sentiment phrases in a database that meet one or more of the proximity rules defined in S540-20. For instance, the non-sentiment phrase "shoes" and "cola" discussed in the above example are considered as connected. It should be noted that a connection may be determined if the phrases comply with more than one proximity rule. For example, an additional rule may require that the phrases "shoes" and "cola" must be mentioned in 50 different web pages and in distance of up to 3 words from each other in order to be considered as connected. All the identified connections (e.g., pairs of non-sentiment phrases) are saved in the data warehouse storage.

In S540-30, from the connections detected at S540-20, all directly connected phrases are identified. Non-sentiment phrases having direct connections contain phrases that are correlative by nature. This may include, for example, non-sentiment phrases that are similar, include the same word(s), are derivatives of the same word(s), and so on. For example, the non-sentiment phrases "football" and "football equipment" are directly connected. The identified direct connections are saved in the data warehouse.

In S540-40, all hidden connections between phrases are determined by filtering out the directly connected non-sentiment phrases from all the connected phrases (identified in S540-20), namely all non-sentiment phrases determined to be in proximity. In an embodiment, S540-40 may include deleting from the data warehouse storage pairs of potentially hidden connected phases that are identified as being directly connected.

In one embodiment, all hidden connections (found in S530) are analyzed to identify at least two hidden connections having at least one common non-sentiment phrase. If such connections are found, a new hidden connection is created by subtracting the at least one common phrase from the at least two hidden connections. In S540-50, the hidden connections between the non-sentiment phrases are saved in the data warehouse and are available for other processes.

Returning to FIG. 5, in S550 sentiment phrases are optionally associated with indirectly connected non-sentiment phrases as may be applicable. In S560, term taxonomies are created by association of sentiment phrases to their respective non-sentiment phrases, including by, but not limited to, aggregation of sentiment phrases with respect to a non-sentiment phrase. The created taxonomies are then stored, for example, in the data warehouse storage 130. This enables the use of the data in the data warehouse storage by means of queries as discussed in more detail hereinabove. In S570, it is checked whether additional textual content is to be gathered, and if so execution continues with S510; otherwise, execution terminates.

In one embodiment, the system, for example and without limitations, any one of the systems 100, 200 and 300 described hereinabove, predicts the expected volume of a trend at a given time, and simultaneously tracks the actual volume of the trend. A volume of a trend is defined by the number of mentions of terms related to the trend and the proximity of the terms from the trend. A grading function then takes the two inputs, the expected and actual volume, and produces a metric for a surprise factor. In one embodiment, the grading function is the difference between the actual and expected volume. For example, the higher the surprise factor, the more trending a term is. Furthermore, the system compares the actual volume of a trend to the predicted volume, while the difference between the predicted and the actual volume receives a predication grade for further and more precise prediction.

In another embodiment, the predication grade is used for separating the variable behavior of trends from their periodic nature. For example but without limitations, the behavior of a trend related to a TV show, can be broken down into two measures, where the system expects the periodic grade to be high for a weekly or maybe daily period, and the predication grade to be high at the end of a season, or before a new one starts.

Once the system detects a periodic behavior or a trend, the system can then define regions of interest related to the trend to point out where most of the volume is to be concentrated and grade a term with respect of its volume concentration. Furthermore, the system can supply a characteristic shape normalized to demonstrate the distribution of the volume within a periodic behavior.

In one embodiment, the system predicts a short term future behavior. This can be achieved by consistently tracking terms being used and by comparing the current volume of mentions of a term to the mentions that occurred in the near past, it can be predicted how a term usage may evolve over time, its respective time frame, and its respective volumes.

This system may use the periodic grade and characteristic shape to predict future volume. The system may further incorporate data from the variable grade, to detect a growing "envelope" of hype and further improve its accuracy.

Figures 7, 8:
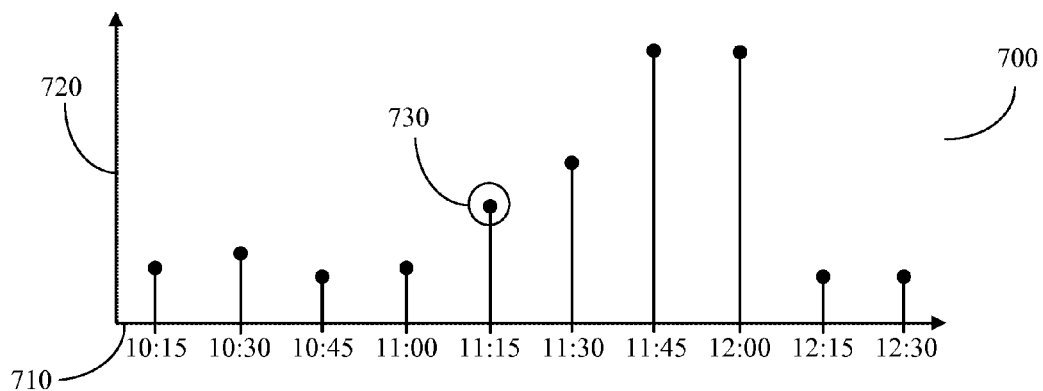
FIG. 7 is a graph describing the signals tracking according to one embodiment.
FIG. 8 is a term correlation matrix produced according to one embodiment.

FIG. 7 shows an exemplary and non-limiting graph 700 describing the tracking volume of the trend of terms according to one embodiment. The horizontal axis 710 uses a 15 minutes time frame resolution where the system tracks the mentions of terms for the purpose of determining a trend. The vertical Axis 720 of the graph 700 shows the volume of the term mentions over the time frame of 15 minutes (labeled as 710). The system, by continuous monitoring, instantly identifies when the trend starts (e.g., at point 730, where a change from the past's baseline is substantial or above a predetermined threshold value) and by that enables a user to act to either to increase or decrease the effect based on the user needs and requirements, e.g., advertize more or less to control the increase or decrease.

The system can further predict behaviors that are not directly connected to the terms tracked based on hidden connections respective of past trends. For example, if a basketball game is broadcast every Thursday evening, the system can predict that on Thursday evenings more people usually order pizza, and even more specifically, the pizzerias from orders are made in a specific area.

In another embodiment, the system predicts future behavior of trends by clustering the terms tracked respective of a certain trend into groups based on this group common behavior. The system identifies a trend having a specific figure and determines the preferences of the trend such as its volume, its life time expectations, when the trend reaches its peak, and so on. In this embodiment, the system can further predict the behavior of a trend by comparing one or more trends related to the same group. For example, by analyzing the time frame of one or more trends related to a basketball game and a tennis game, the system can predict the time frame of a trend related to a baseball game.

In one embodiment, the system recognizes the general context of a user generated content and clusters the content to a group based on this recognition. In another embodiment, the clustering of the user generated content is made by generating all the terms of the user generated content to determine the probability that the content is related to a specific group of trends related to politics. In another embodiment, the clustering of the user generated content to groups is made based on relations between terms.

FIG. 8 shows an exemplary and non-limiting term correlation matrix 800 generated according to an embodiment of the invention. According to this embodiment, the system determines the probability of a correlation between terms and the probability that these terms are related. For example, when the system tracks the term "iPhone"®, it can be determined that the probability that the term "smartphone" will be mentioned in the same context at 810. After determining the probability that these two terms will be mentioned in the same context, the system can determine the probability that the content is related to the mobile phones group (not shown). In one embodiment, the system is consistently updated so that terms which are related to several groups are clustered to other terms determined to be related. For example, the word "Apple" can be related to food and beverages groups, to technology groups, or to geographic groups when related to New York City also known as "the big apple." It is the context and other terms that will determine the true meaning of the term "apple" and hence the effect on the trend analysis and trend prediction.

In one embodiment, the prediction is based on estimating conditional probability. This is the maximum-likelihood predictor under the assumption of a wide-sense-stationary model, in the sense that when X is mentioned, the system knows what the chances are for Y to be mentioned by the same user.

In another embodiment, the system is capable of predicting future behavior of trends by tracking the cyclic behavior of trends. For example, the system identifies the behavior of a trend related to the $4^{th}$ of July over several years and predicts the behavior of trend related to the $4^{th}$ of July in the following year. Alternatively, the system detects trend changes around the Sunday football matches and based on that behavior makes predictions on future trends.

Figure 9:
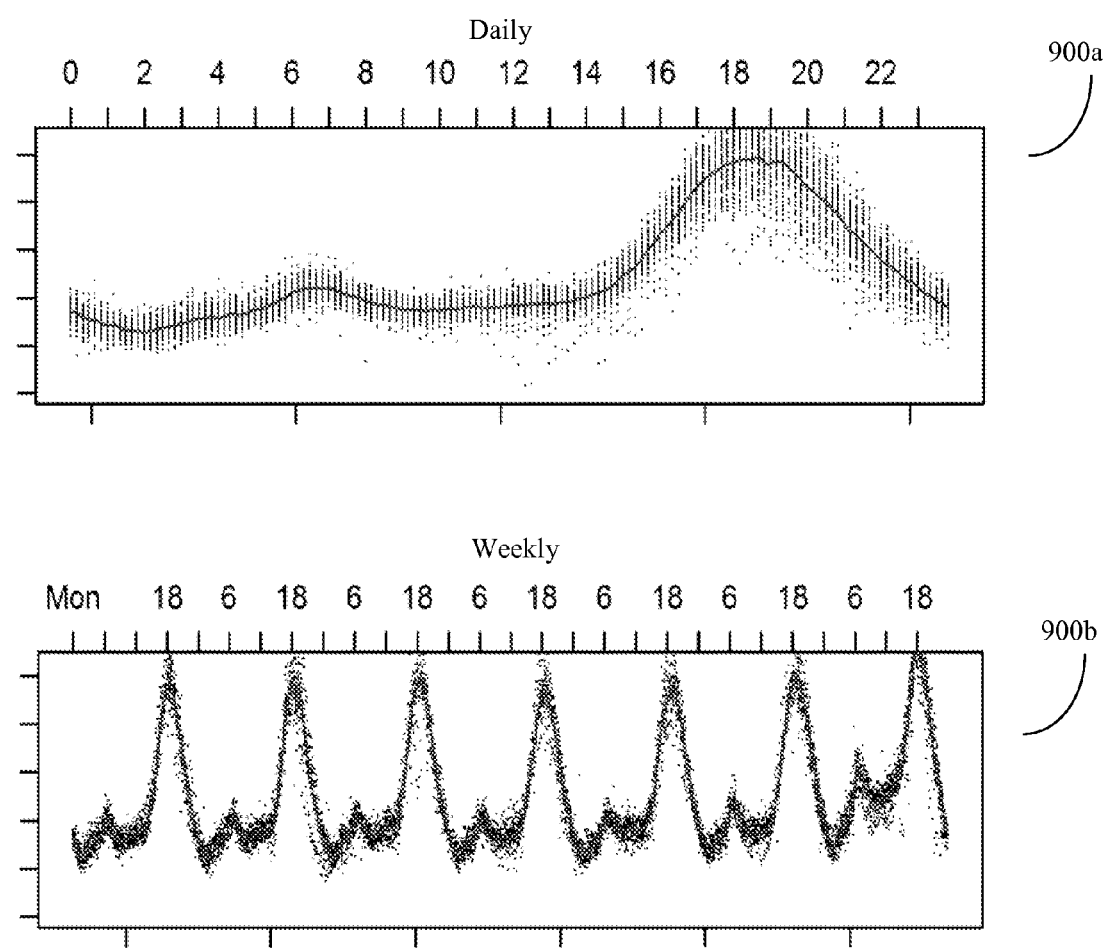
FIG. 9 are graphs describing the tracking of terms according to one embodiment.

FIG. 9 depicts exemplary and non-limiting graphs 900a and 900b describing the tracking of terms according to an embodiment over different time frames. According to the graph 900a, the system predicts the cyclic behavior of a trend related to the term 'dinner' based on daily tracking of the mentions of the term 'dinner' over that time frame. In graph 900b, the system predicts the cyclic behavior of a trend related to the term 'dinner' based on weekly tracking of the mentions of the term 'dinner' over that time frame. In this embodiment, the system monitors the terms respective of the trend and represents it as a signal, i.e., using for example the Nyquist-Shannon Sampling Theorem to represent the signal function x(t) from samples obtained at a frequency of at least double the frequency of the signal. Using digital signal processing techniques allows the system to predict the cycles of that trend. Another way of processing the signals is by recognizing what type of cycle is processed and realizing based on peak-to-dip relations whether the cycle is periodic or not.

Figure 10:
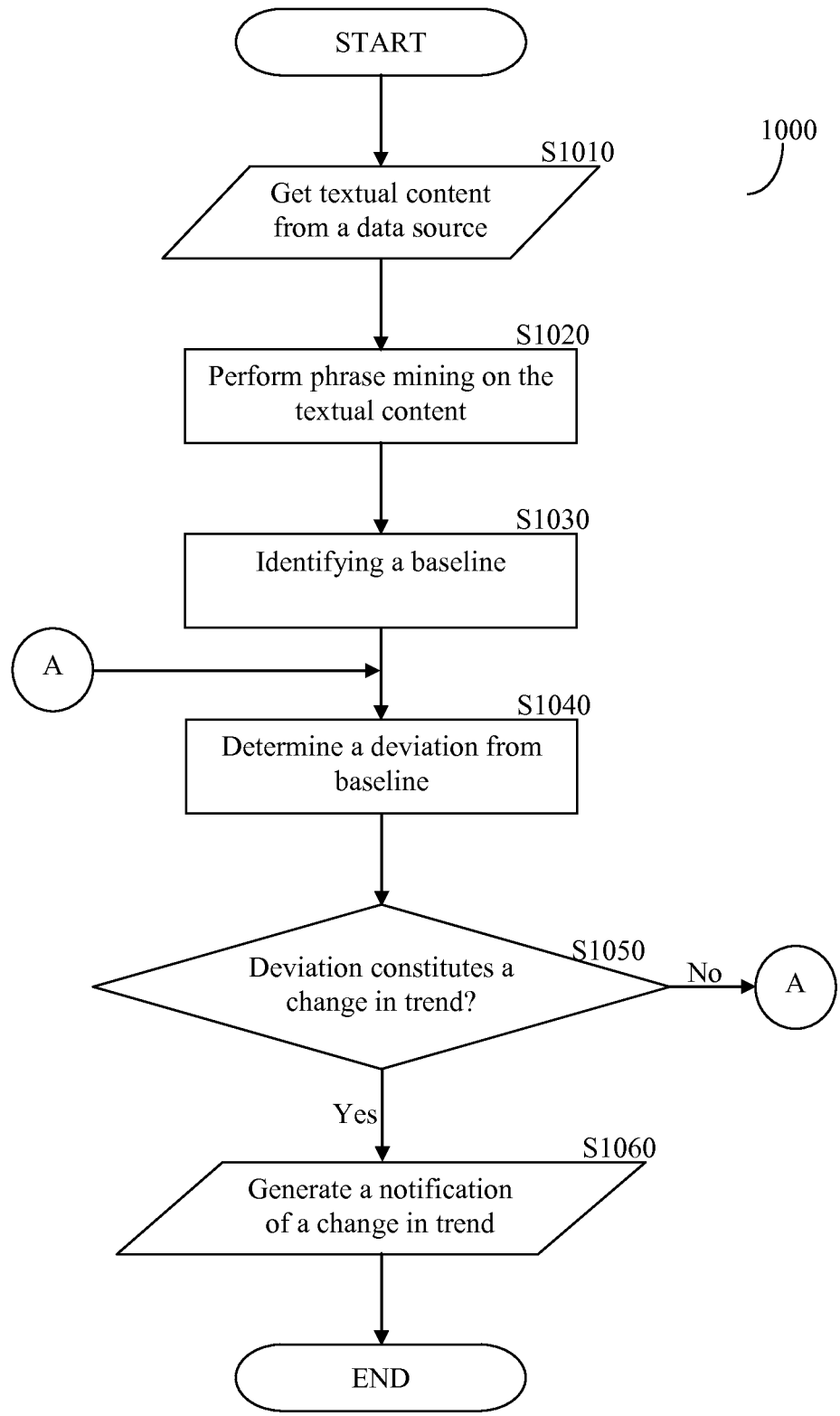
FIG. 10 is a flowchart describing a method for real-time detection of trends according to one embodiment.

FIG. 10 shows an exemplary and non-limiting flowchart 1000, describing a method for real-time detection of trends according to one embodiment. In S1010, the system, for example and without limitations, any one of the systems 100, 200 and 300 described hereinabove, receives textual content from one or more information sources. In S1020, phrase mining is performed. The phrase mining includes at least the detection of phrases in the received content. In S1030, a baseline is identified with regard to the mentions of one or more of the detected phrases over a predefined period of time in at least one information source. In S1040, a deviation of current mentions of the one or more phrases from the baseline is determined. In S1050, it is checked whether the deviation from baseline constitutes a change in trend and if so, execution continues with S1060; otherwise execution returns to S1040. In S1060 a notification of a change in trend is generated and execution terminates. It should be noted that current mentions may be tracked during a period of time different from the period of time for which the baseline is computed.

The various embodiments of the invention are implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for predicting future trends of term taxonomies of users generated content, comprising:
at least one processor configured to:
access via a network interface one or more data sources to receive the users generated content;
generate phrases from the users generated content, the phrases including sentiment phrases and non-sentiment phrases, wherein each of the sentiment phrases includes one or more words describing a sentiment, the sentiment being any one of: a positive sentiment, a neutral sentiment, and a negative sentiment;
periodically analyze via an analysis unit one or more term taxonomies to determine at least a trend of at least one of the non-sentiment phrases with respect of a plurality of the respective sentiment phrases, wherein a term taxonomy is an association between the non-sentiment phrase and the sentiment phrases; and
generate via an analysis unit a prediction of future behavior of the at least trend with respect of the one or more term taxonomies.

2. The system of claim 1, wherein the analysis unit is further configured to detect non-sentiment and sentiment phrases in the users generated content and to generate at least an association between the non-sentiment phrases and the sentiment phrases based on a weighted sentiment score generated respective of the detected phrases.

3. The system of claim 2, wherein the analysis unit is further configured to collect data respective of a group of one or more terms taxonomies.

4. The system of claim 1, wherein the analysis unit is further configured to monitor cycles of the at least trend and predict at least cyclic behavior of the at least trend based on similar past trends.

5. The system of claim 4, wherein the analysis unit is further configured to:
predict an expected volume of the at least trend at a given time;
simultaneously track an actual volume of the at least trend; and
compute a surprise factor to determine a general direction of the at least trend using a grading function.

6. The system of claim 5, wherein the grading function is a difference between the actual volume and the expected volume of the at least trend.

7. The system of claim 5, wherein the analysis unit is further configured to constantly track a volume of one term taxonomy over a predefined time frame to determine when the at least trend changes direction.

8. The system of claim 7, wherein the analysis unit is further configured to generate a notification when the at least trend changes direction.

9. The system of claim 5, wherein the analysis unit is further configured to generate a correlation matrix, wherein each cell in the correlating matrix determines a probability of a correlation between at least two terms taxonomies.

10. A computer implemented method for predicting future trends of terms taxonomies of users generated content, comprising:
   crawling one or more sources of users generated content to collect phrases mentioned by users of the one or more data sources;
   periodically analyzing one or more term taxonomies to determine at least a trend of at least a non-sentiment phrase with respect to a plurality of sentiment phrases, wherein each of the sentiment phrases includes one or more words describing a sentiment, the sentiment being any one of: a positive sentiment, a neutral sentiment, and a negative sentiment, and wherein a term taxonomy is an association between the non-sentiment phrase and at least one of the plurality of sentiment phrases; and
   generating a prediction of future behavior of the at least trend with respect of the one or more term taxonomies.

11. The computer implemented method of claim 10, further comprises:
   associating between a non-sentiment phrase and a sentiment phrase of the collected phrases to create a term taxonomy.

12. The computer implemented method of claim 11, further comprises:
   storing results of the at least trend and the created term taxonomies in a data warehouse storage, wherein the stored results of the at least trend are available upon receiving a request to generate a trend report regarding the at least trend.

13. The computer implemented method of claim 10, further comprises:
   collecting data respective of the one or more term taxonomies and grouping the one or more term taxonomies in usable forms; and
   collecting data respective of a group of one or more terms taxonomies.

14. The computer implemented method of claim 11, further comprises:
   monitoring cycles of the at least trend; and
   predicting cyclic behavior of the at least trend based on similar past statistical trends.

15. The computer implemented method of claim 14, further comprising:
   predicting an expected volume of the at least trend at a given time;
   simultaneously tracking an actual volume of the at least trend; and
   computing a surprise factor to determine a general direction of the at least trend using a grading function.

16. The computer implemented method of claim 15, wherein the grading function is a difference between the actual volume and the expected volume of the at least trend.

17. The computer implemented method of claim 15, further comprises:
   constantly tracking the volume of one term taxonomy over a predefined time frame to determine when the at least trend changes direction.

18. The computer implemented method of claim 17, further comprises:
   generating a notification when the at least trend changes direction.

19. The computer implemented method of claim 15, further comprises:
   generating a correlation matrix, wherein each cell in the correlating matrix determines a probability of a correlation between at least two terms taxonomies.

20. The computer implemented method of claim 10, wherein the data source is at least one of: a social network, a blog, a news feed, and a web page.

21. A non-transitory computer readable medium having stored thereon instructions for causing one or more processing units to execute the method according to claim 10.

* * * * *